United States Patent
Heider et al.

(10) Patent No.: US 8,080,942 B2
(45) Date of Patent: Dec. 20, 2011

(54) SYSTEM AND METHOD FOR ELECTRONIC ADAPTIVE FRONT-LIGHTING

(75) Inventors: Christian Heider, Regensburg (DE); Luis Sampedro Diaz, Mountain View, CA (US)

(73) Assignees: Volkswagen AG, Wolsburg (DE); Audi AG, Ingolstadt (DE)

( * ) Notice: Subject to any disclaimer, the term of this patent is extended or adjusted under 35 U.S.C. 154(b) by 453 days.

(21) Appl. No.: 12/392,060

(22) Filed: Feb. 24, 2009

(65) Prior Publication Data

US 2010/0213872 A1 Aug. 26, 2010

(51) Int. Cl.
*B60Q 1/14* (2006.01)
(52) U.S. Cl. ............ 315/77; 315/82; 362/487; 362/543; 362/545; 307/10.1
(58) Field of Classification Search .................... 315/77, 315/82; 362/459, 487, 516, 543, 545; 307/10.1, 307/10.8
See application file for complete search history.

(56) References Cited

U.S. PATENT DOCUMENTS

| | | | | |
|---|---|---|---|---|
| 6,265,829 | B1 * | 7/2001 | Perdec | 315/82 |
| 6,454,450 | B1 * | 9/2002 | Oishi et al. | 362/544 |
| 7,019,463 | B2 * | 3/2006 | Kesterson | 315/82 |
| 7,384,176 | B2 * | 6/2008 | Ishida | 362/545 |
| 7,482,756 | B2 * | 1/2009 | Kesterson | 315/82 |
| 7,950,837 | B2 * | 5/2011 | Yatsuda et al. | 362/545 |
| 2007/0003108 | A1 | 1/2007 | Chinomi et al. | |

FOREIGN PATENT DOCUMENTS

| | | |
|---|---|---|
| DE | 10 2005 014 953 | 10/2006 |
| DE | 10 2006 039 182 | 3/2008 |
| WO | WO 2007/122544 | 11/2007 |

\* cited by examiner

*Primary Examiner* — Thuy Vinh Tran
(74) *Attorney, Agent, or Firm* — Kenyon & Kenyon LLP

(57) ABSTRACT

A system and method relates to electronic adaptive front-lighting of a vehicle, including at least one fixed solid state light source. The fixed solid state light source is configured to illuminate a front peripheral region of a vehicle. In addition, the fixed solid state light source is integrated with a daytime running light module of the vehicle.

26 Claims, 10 Drawing Sheets

SYSTEM AND METHOD FOR ELECTRONIC ADAPTIVE FRONT-LIGHTING

FIELD OF THE INVENTION

The present invention relates to a system and method for electronic adaptive front-lighting of a vehicle.

BACKGROUND INFORMATION

There are some systems available today for adaptive front-lighting of a vehicle. These systems seek to provide dynamic front lighting, or curve lighting functionality, for a vehicle and may be commercially available under the names "Adaptive Front-Lighting System" or "Advanced Front-Lighting System" ("AFS").

The systems that are currently available may typically use mechanical systems to provide the curve lighting functionality. For example, motors, such as stepper motors, may rotate a lens, a reflector, a mount, or a light source of a headlamp, or an entire light module. The stepper motors may receive signals to steer the light beam in horizontal and/or vertical directions. A particular steering angle of the light beam may be defined as a function of vehicle speed and steering wheel angle. In addition, a typical range of rotation of the light beam may be ±15 degrees left/right and ±15 degrees up/down. As a result, a roadway may be much more effectively illuminated by the curve lighting functionality, thereby increasing safety and comfort.

FIG. 1 shows a schematic view of a conventional system 1 for adaptive front-lighting of a vehicle. The system 1 includes a low-beam light source 2, a high-beam light source 3, and a side marker light source 4. According to the system 1 for adaptive front-lighting, the low-beam light source 2 may be rotated about the Z axis, in order to change the horizontal steering angle of the light beam, and the low-beam light source 2 may also be rotated about the X axis, in order to change the vertical steering angle of the light beam. These rotations may be effected by motors, such as stepper motors, for example.

The system 1, as shown in FIG. 1, is of a left side headlamp; however, it should be understood that a right side headlamp would be a mirror image of FIG. 1.

FIG. 2 shows a schematic top view of a lighting distribution using a system 1 for adaptive front-lighting of a vehicle. This Figure illustrates a driving situation in which the vehicle is driving along a roadway curving towards the left. In a vehicle without a system 1 for adaptive front-lighting, a standard light distribution 5 having a center axis 6 may be projected forward of the vehicle. This standard light distribution 5 cannot be changed because the vehicle lacks adaptive front-lighting.

However, in a vehicle having a system 1 for adaptive front-lighting, an angled light distribution 7 having a center axis 8 may be projected forward and to the left side of the vehicle. By rotating the low-beam light source 2 about the Z axis towards the left side of the vehicle, the angled light distribution 7 may be projected in order to increase driver safety and comfort. As shown in FIG. 2, the low-beam light source 2 has been rotated an angle β towards the left side of the vehicle, for example. The angle β may be defined based on, for example, a vehicle speed, a steering wheel angle, road characteristics, etc.

The angled light distribution 7 of the system 1, as shown in FIG. 2, is angled towards the left side of the vehicle for the driving situation in which the vehicle is driving along a roadway curving towards the left. However, it should be understood that a similar angled light distribution of the system 1 may be angled towards the right side of the vehicle for the driving situation in which the vehicle is driving along a roadway curving towards the right.

FIG. 3 shows a schematic block diagram of a conventional system for controlling adaptive front-lighting of a vehicle. The control system may include a system left headlamp 1, a system right headlamp 1, a control unit 9, and input data 10. Input data 10 may include vehicle data, such as, for example, vehicle speed, steering wheel angle, road characteristics, etc. Input data 10 may be fed into the control unit 9, which then controls each of the system left and right headlamps 1 to steer the light beam.

However, these mechanical systems having moving parts may present many technical challenges, such as space, weight, and quality constraints, for example. In particular, the moving parts must be designed so that they do not collide with other components in the headlamp. Also, the moving parts require additional mechanical structure and motors, which may add unwanted weight to the headlamp. In addition, the moving parts may create quality issues, such as disconnected cables, or other overall malfunctions of the headlamp, for example.

Accordingly, it may be desirable to have a system that achieves dynamic front lighting, or curve lighting functionality, without moving parts. There have been some proposals to achieve such dynamic front lighting without moving parts. However, the proposed systems require advanced technology and/or advanced production capability, thereby adversely affecting both cost and feasibility.

German Published Patent Application No. 10 2005 014 953 describes a vehicle having a matrix of LEDs for forward illumination, and a control device that detects an oncoming vehicle on a road and steers, switches off, dims, or covers by a diaphragm, an LED directed at the detected oncoming vehicle.

German Published Patent Application No. 10 2006 039 182 describes a vehicle having a light radiating device with two or more LED segments, and a control device to vary the emitted radiation intensity of the LED segments.

U.S. Patent Application Publication No. 2007/0003108 describes a system having a plurality of light emitting diodes (LEDs) arranged in a matrix in order to achieve both vertical and horizontal light steering. However, heat management and cost may be challenges with such a system because the accuracy of such a system is directly proportional to the number of LEDs utilized.

Also, BMW is believed to have proposed an adaptive front-lighting system that is referred to as "Pixel Light." In this system, micro mirror devices each reflect one pixel of a light beam. Further, the light beam is fixed in place but can be programmed to suit the conditions in front of a vehicle.

PCT International Published Patent Application No. WO2007/122544 describes a system that places a liquid crystal element in front of a light source in order to steer the light beam.

SUMMARY

Example embodiments of the present invention provide a system and method for electronic adaptive front-lighting of a vehicle.

According to example embodiments of the present invention, a system for electronic adaptive front-lighting of a vehicle is provided, which includes at least one fixed solid state light source configured to illuminate a front peripheral region of a vehicle. In addition, the at least one fixed solid state light source is configured to be integrated with a daytime running light module of the vehicle.

The at least one fixed solid state light source may include at least one light emitting diode.

The system may further include an optical element configured to provide a smooth light distribution.

The optical element may include at least one of: (a) a reflector, and (b) a lens.

The at least one fixed solid state light source may be configured to share a location with a light source of the daytime running light module.

The at least one fixed solid state light source may include a plurality of fixed light sources.

The plurality of fixed light sources may be configured to be arranged at least one of: (a) vertically, (b) horizontally, (c) diagonally, (d) in a straight line, and (e) in a curved line.

The plurality of fixed light sources may be each configured to illuminate a different front peripheral region of the vehicle.

The plurality of fixed light sources may be each configured to share a location with a light source of the daytime running module.

The system may further include a control unit configured to independently control the at least one fixed solid state light source.

The control unit may be configured to independently control the at least one fixed solid state light source based on at least one of: (a) a particular driving situation, (b) a vehicle speed, (c) a steering wheel angle, (d) a proximity to other vehicles, (e) a selected driving program, (f) an actuation of an input device, and (g) road characteristics.

The control unit may be configured to vary an intensity of the at least one fixed solid state light source based on an angle at which an overall light distribution is to be directed.

The varying intensity of the at least one fixed solid state light source may include at least one of: (a) automatic dimming, (b) comfort dimming, (c) steep dynamic dimming, (d) smooth dynamic dimming, and (e) individually defined dimming modes.

The control unit may be configured to be at least one of: (a) automatically activated, and (b) manually activated.

The control unit may be configured to be automatically activated based on at least one of: (a) haptic feedback of a steering wheel, (b) haptic feedback of pedals, (c) haptic feedback of a vehicle suspension, and (d) engine behavior.

The control unit may be configured to be manually activated based on at least one of: (a) a dedicated switch, and (b) a dedicated menu of vehicle controls.

The features of a method for electronic adaptive front-lighting of a vehicle may have similar advantages as the features of the system for electronic adaptive front-lighting of a vehicle.

According to example embodiments of the present invention, a method for electronic adaptive front-lighting of a vehicle includes: illuminating, by at least one fixed solid state light source, a front peripheral region of a vehicle. The at least one fixed light source is integrated with a daytime running light module of the vehicle.

The method may further include providing, by an optical element, a smooth light distribution.

The at least one fixed solid state light source may share a location with a light source of the daytime running module.

The at least one fixed solid state light source may include a plurality of fixed light sources.

The plurality of fixed light sources may be arranged at least one of: (a) vertically, (b) horizontally, (c) diagonally, (d) in a straight line, and (e) in a curved line.

The plurality of fixed light sources may each illuminate a different front peripheral region of the vehicle.

The plurality of fixed light sources may each share a location with a light source of the daytime running module.

The method may further include independently controlling, by a control unit, the at least one fixed solid state light source.

The control unit may independently control the at least one fixed solid state light source based on at least one of: (a) a particular driving situation, (b) a vehicle speed, (c) a steering wheel angle, (d) a proximity to other vehicles, (e) a selected driving program, (f) an actuation of an input device, and (g) road characteristics.

The control unit may vary an intensity of the at least one fixed solid state light source based on an angle at which an overall light distribution is to be directed.

The control unit may vary the intensity of the at least one fixed solid state light source by at least one of: (a) automatic dimming, (b) comfort dimming, (c) steep dynamic dimming, (d) smooth dynamic dimming, and (e) individually defined dimming modes.

The control unit may be at least one of: (a) automatically activated, and (b) manually activated.

The control unit may be automatically activated based on at least one of: (a) haptic feedback of a steering wheel, (b) haptic feedback of pedals, (c) haptic feedback of a vehicle suspension, and (d) engine behavior.

The control unit may be manually activated based on at least one of: (a) a dedicated switch, and (b) a dedicated menu of vehicle controls.

Example embodiments of the present invention are explained in greater detail in the following text with reference to the appended Figures.

DETAILED DESCRIPTION

Figure 1:
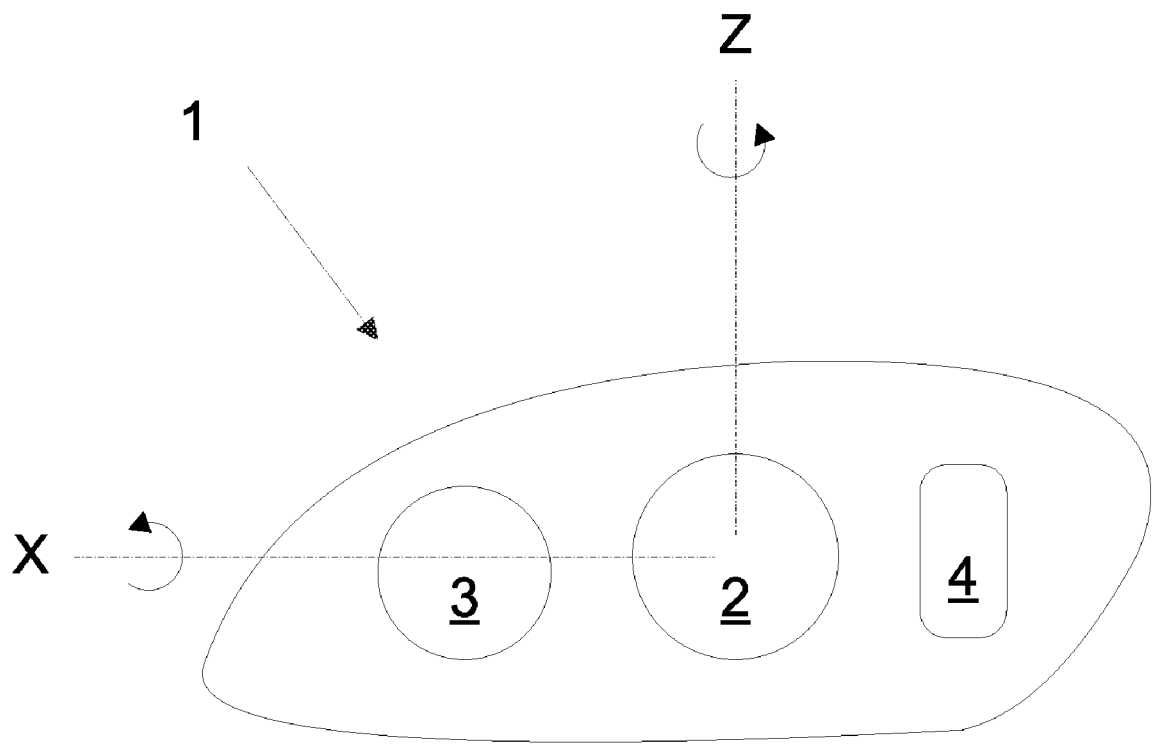
FIG. 1 is a schematic view of a conventional system for adaptive front-lighting of a vehicle.
Figure 2:
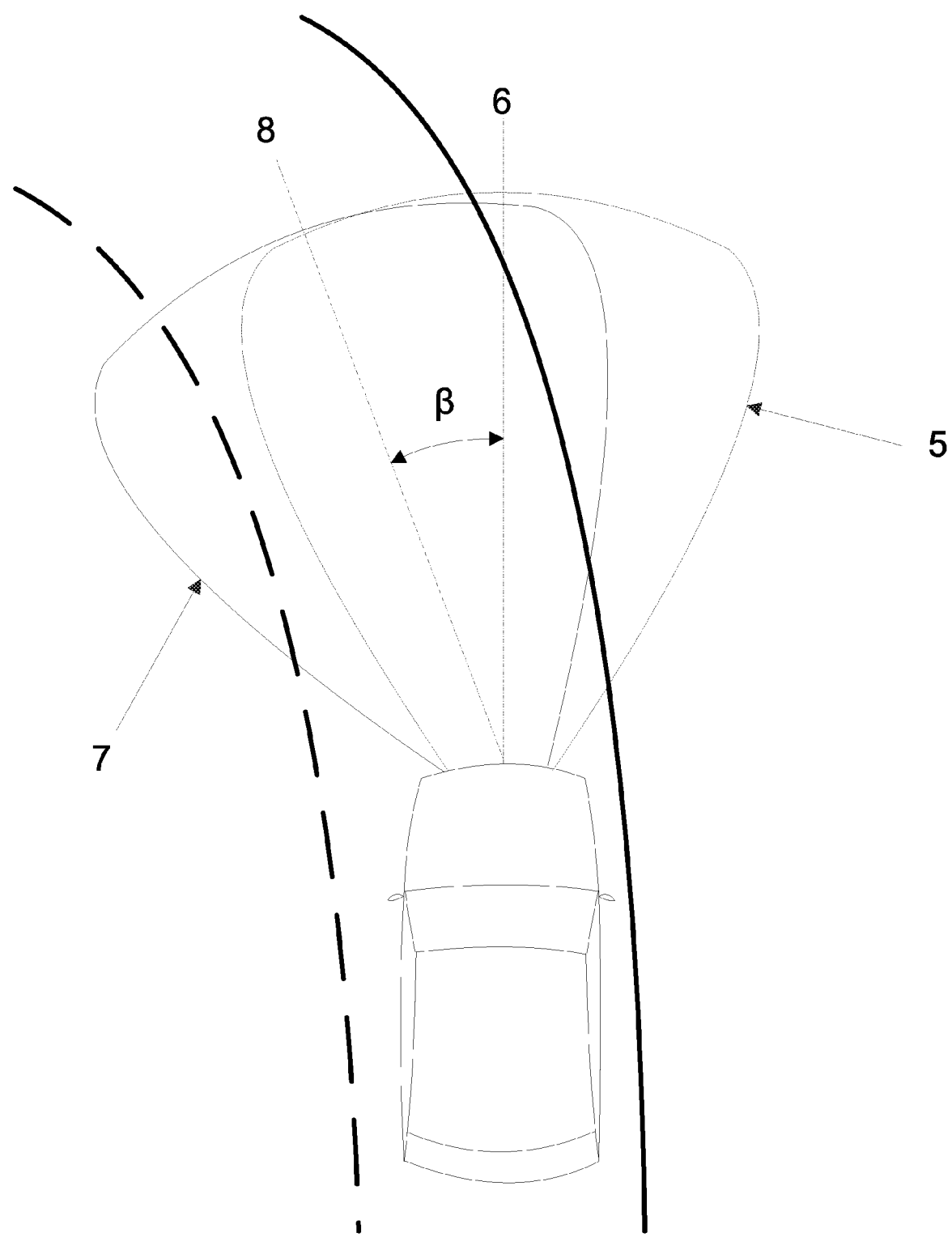
FIG. 2 is a schematic top view of a lighting distribution using a conventional system for adaptive front-lighting of a vehicle.
Figure 3:
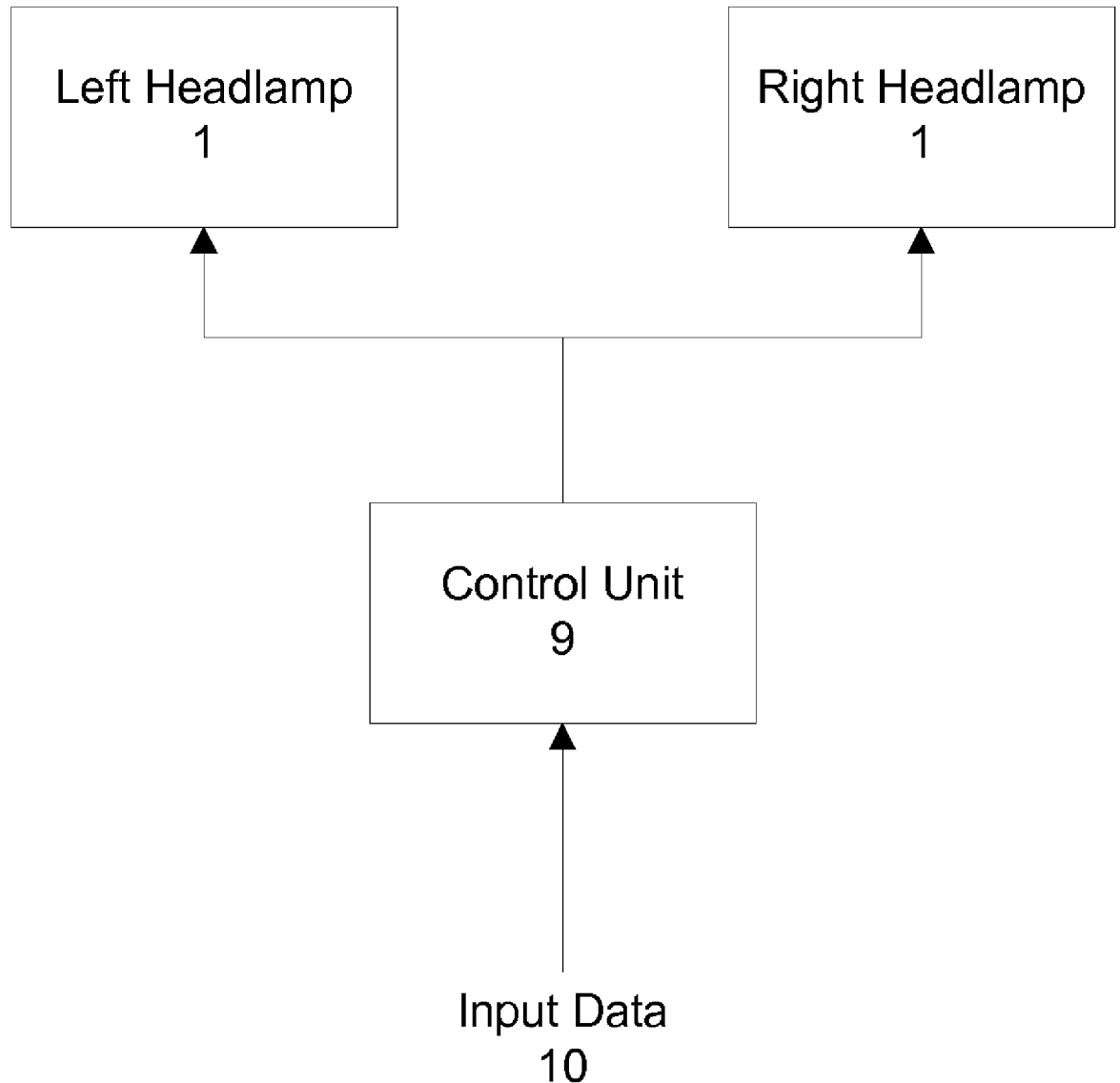
FIG. 3 is a schematic block diagram of a conventional system for controlling adaptive front-lighting of a vehicle.
Figure 4:
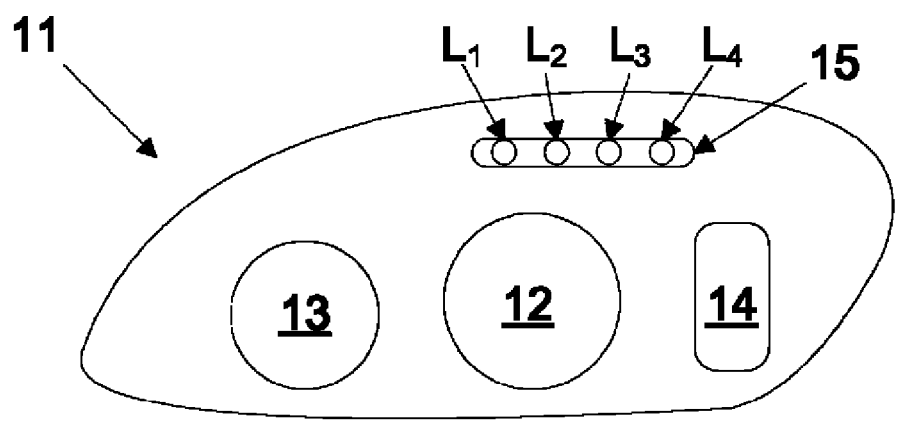
FIG. 4 illustrates example embodiments of a system for electronic adaptive front-lighting of a vehicle.
Figure 4:
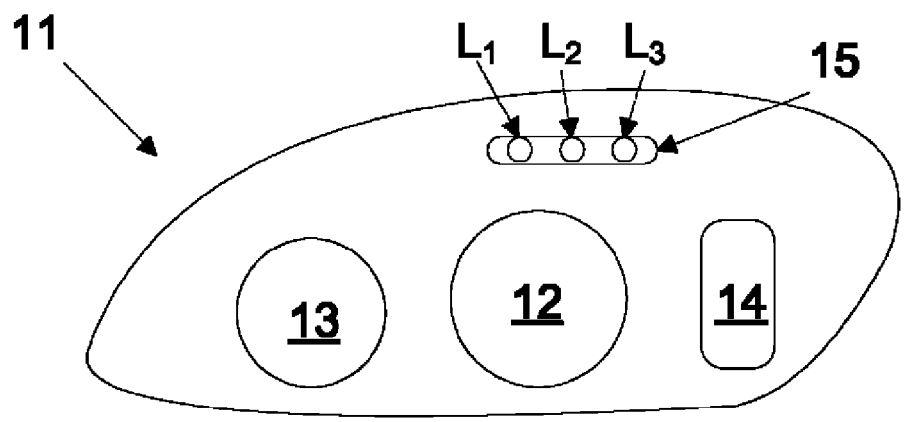
Figure 4:
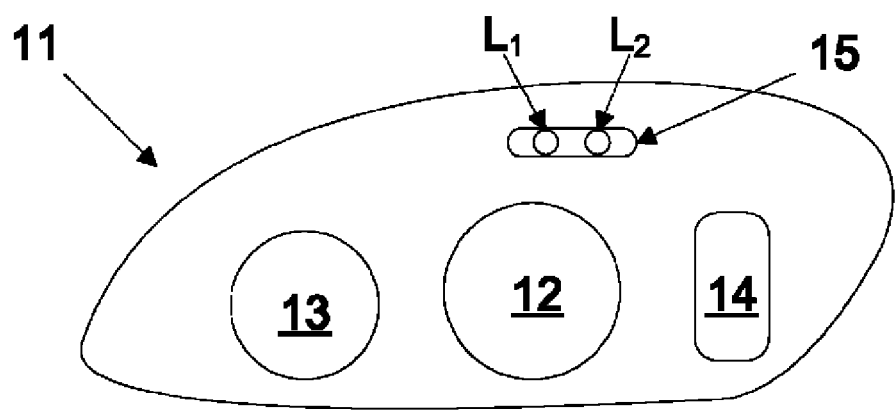
Figure 5:
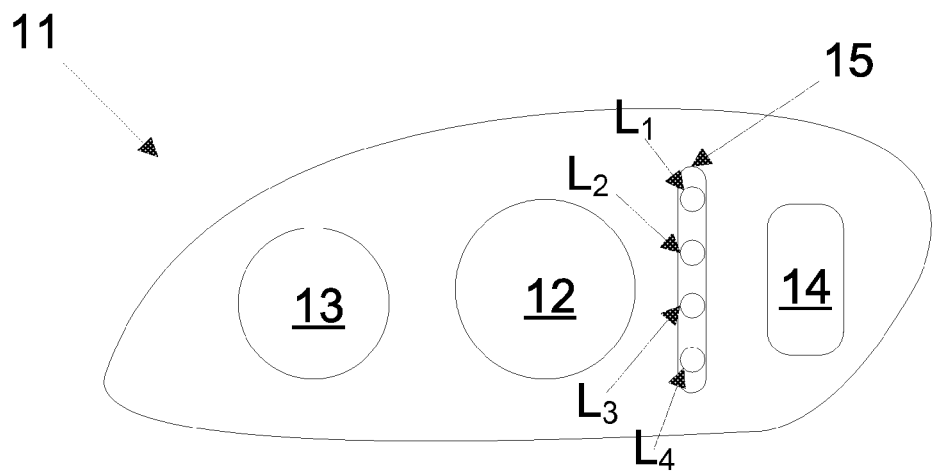
FIG. 5 illustrates example embodiments of a system for electronic adaptive front-lighting of a vehicle.
Figure 5:
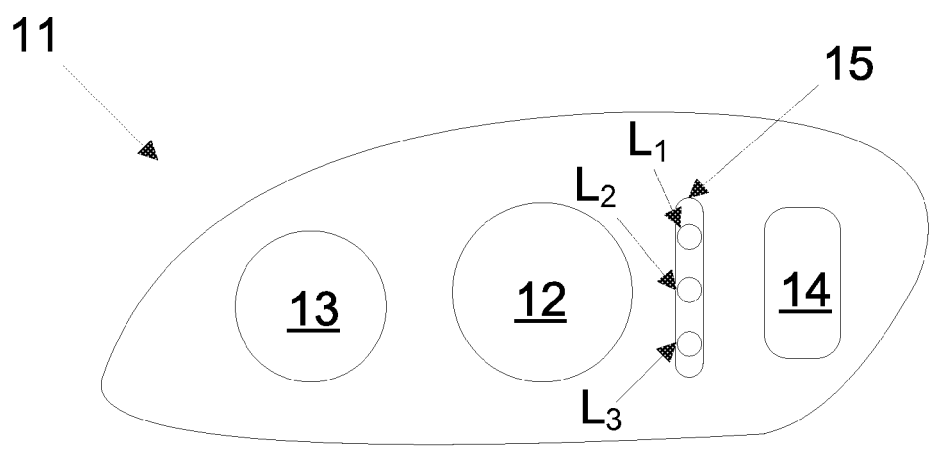
Figure 5:
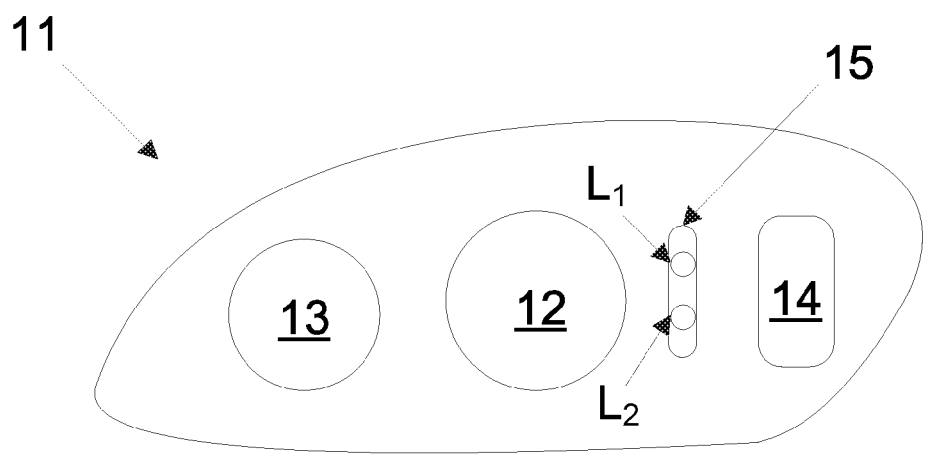

FIGS. 4 and 5 illustrate example embodiments of a system 11 for electronic adaptive front-lighting (eAFS) of a vehicle.

This system 11 may provide a feasible and cost-effective solution to achieve dynamic curve light functionality without moving parts.

The example embodiments of the system 11, as shown in FIGS. 4 and 5, may include a low-beam light source 12, a high-beam light source 13, a side marker light source 14, and an electronic adaptive front-lighting system light-emitting diode (eAFS LED) module 15. The low-beam, high-beam, and side marker light sources 12, 13, 14 may include any lighting technology, such as incandescent, halogen, xenon, LEDs, etc. The example embodiments shown in FIGS. 4 and 5 include eAFS LED modules 15 having two, three, and four light sectors $L_1, L_2, L_3, L_4$. Each light sector may include one or more LEDs. In addition, FIG. 4 shows the light sectors $L_x$ arranged in a horizontal row, whereas FIG. 5 shows the light sectors $L_x$ arranged in a vertical row. However, it should be understood that the system 11 is not limited to the illustrated example embodiments of the system 11. The number of light sectors $L_x$ may be varied, and the arrangement of the light sectors $L_x$ may also be varied, such as horizontally, vertically, diagonally, in a straight line, in a curved line, etc.

The system 11, as shown in FIGS. 4 and 5, is of a left side headlamp; however, it should be understood that a right side headlamp would be a mirror image of FIGS. 4 and 5.

Figure 6:
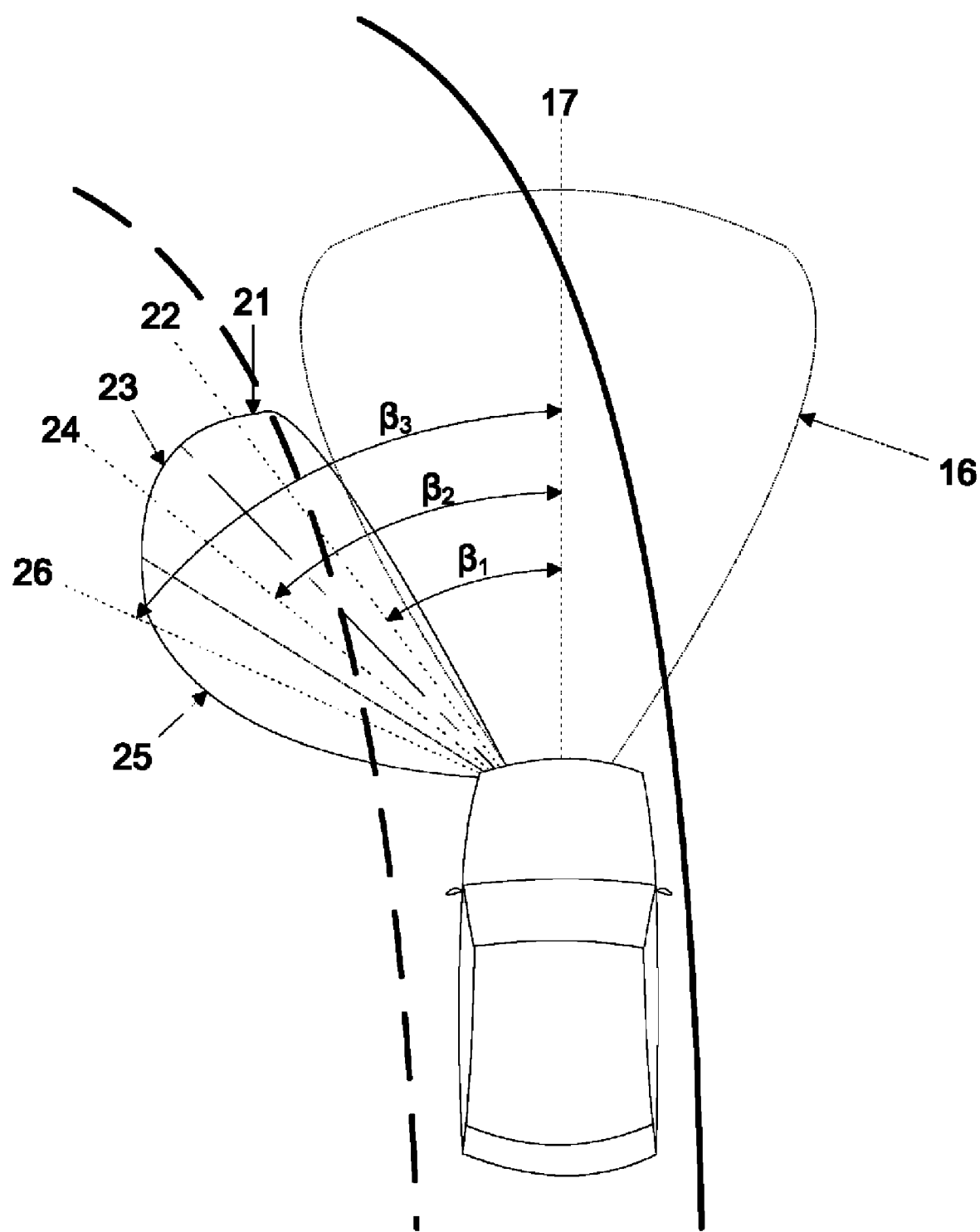
FIG. 6 is a schematic top view of a lighting distribution using an example embodiment of a system for electronic adaptive front-lighting of a vehicle.

FIG. 6 shows a schematic top view of a lighting distribution using an example embodiment of a system 11 for electronic adaptive front-lighting of a vehicle. This Figure illustrates a driving situation in which the vehicle is driving along a roadway curving towards the left. In addition, this Figure illustrates an example embodiment of the system 11 having an eAFS LED module 15 with three light sectors $L_1, L_2, L_3$.

As shown in FIG. 6, the low-beam light source 12 projects a standard light distribution 16 having a center axis 17 forward of the vehicle. In addition, the light sectors $L_1, L_2, L_3$ project light beams 21, 23, 25, respectively, having center axes 22, 24, 26, respectively, at angles $\beta_1, \beta_2, \beta_3$, respectively, from the center axis 17 of the standard light distribution 16. Each of the light sectors $L_1, L_2, L_3$ may include one or more LEDs, based on the LED type and the amount of light required for each sector. Further, the light intensity of each of the light sectors may be independently controlled. In this manner, the light distributions 16, 21, 23, 25 may be optimally controlled based on a particular driving situation, a vehicle speed, a steering wheel angle, a proximity to other vehicles, a selected driving comfort/behavior program, an actuation of an input device such as a switch or any other human-machine interface, road characteristics such as curvature or width, etc.

Each light sector $L_1, L_2, L_3$ may be defined at a particular angle $\beta_1, \beta_2, \beta_3$. Exemplary values for these angles may be, for example, $\beta_1=5°$, $\beta_2=10°$, $\beta_3=15°$, or $\beta_1=10°$, $\beta_2=17°$, $\beta_3=24°$. Other values for these angles may also be used.

Further, each LED of each light sector may include an optical element to assure smooth light distribution throughout each light sector. The optical element may include a lens, a reflector, etc. The particular optical element utilized may depend upon the particular angles $\beta_1, \beta_2, \beta_3$ and the size of the desired illumination area for each light sector $L_1, L_2, L_3$, for example.

The light sectors 21, 23, 25 of the exemplary system 11, as shown in FIG. 6, illuminate areas forward and to the left of the vehicle for the driving situation in which the vehicle is driving along a roadway curving towards the left. However, it should be understood that similar light sectors of the exemplary system 11 may illuminate areas forward and to the right of the vehicle for the driving situation in which the vehicle is driving along a roadway curving towards the right.

Figure 7:
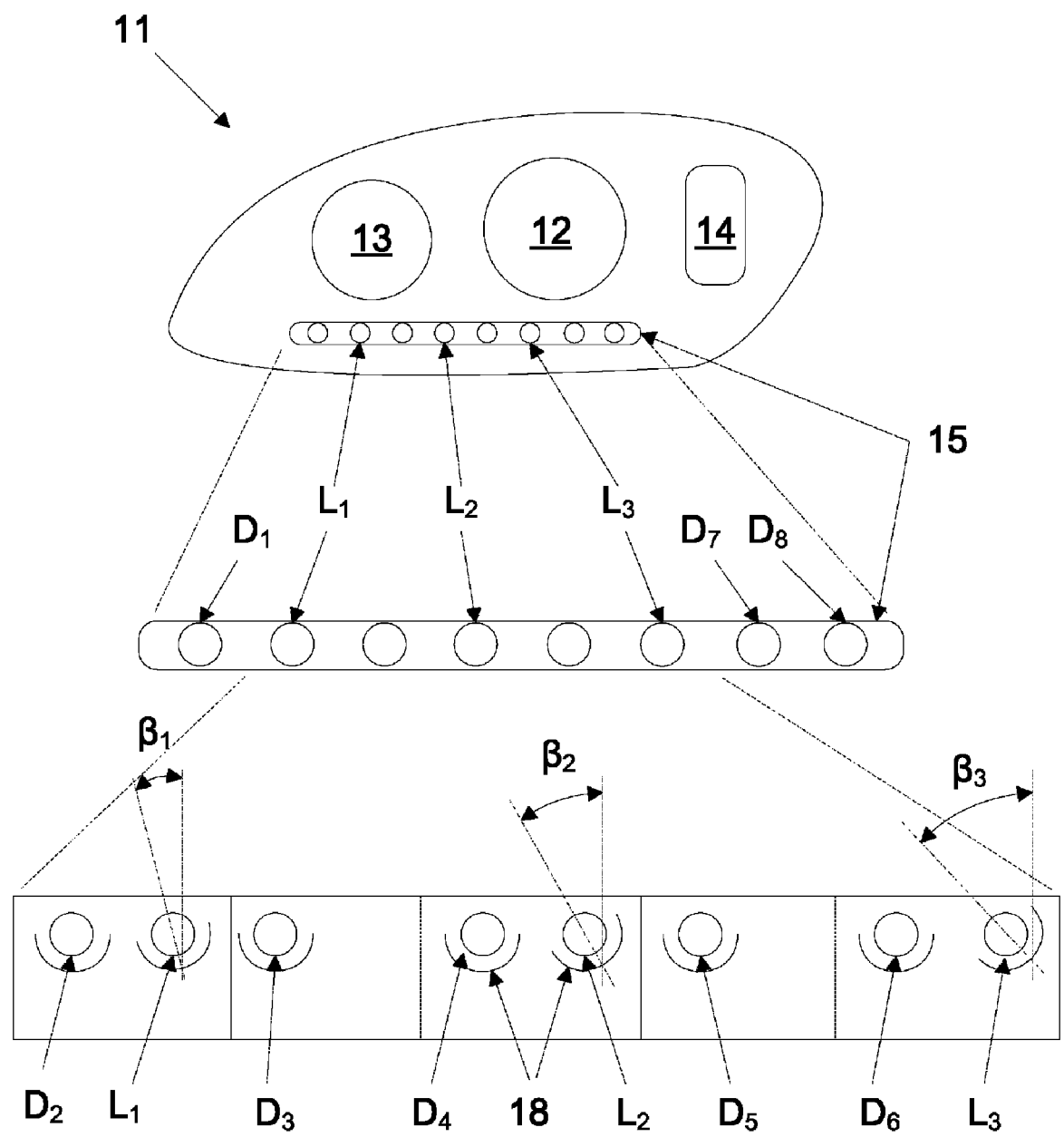
FIG. 7 illustrates an example embodiment of a system for electronic adaptive front-lighting of a vehicle.

FIG. 7 illustrates an example embodiment of a system 11 for electronic adaptive front-lighting of a vehicle. The system 11 may include a low-beam light source 12, a high-beam light source 13, a side marker light source 14, and an integrated daytime running light (DRL) and eAFS LED module 15.

As shown in this example embodiment, the integrated DRL and eAFS LED module 15 includes daytime running light LEDs $D_1$ to $D_8$ and eAFS LED light sectors $L_1$ to $L_3$. It should be understood that the system 11 is not limited to the illustrated example embodiment of the system 11. The number of light sectors $L_x$ may be varied, and the arrangement of the light sectors $L_x$ may also be varied, such as horizontally, vertically, diagonally, in a straight line, in a curved line, etc. In addition, the light sectors $L_1$ to $L_3$ may each share the same location as one of the daytime running lights $D_1$ to $D_8$. For example, as shown in FIG. 7, light sector $L_1$ shares the same location as daytime running light $D_2$, light sector $L_2$ shares the same location as daytime running light $D_4$, and light sector $L_3$ shares the same location as daytime running light $D_6$.

It should be appreciated that the daytime running light module may be located outside of the headlamp, e.g., located somewhere in the front bumper of the vehicle. Furthermore, the electronic adaptive front-lighting system be a standalone module, e.g., independent from and not integrated in the daytime running light module.

Further, FIG. 7 schematically illustrates optical elements 18 as semicircular elements. The optical elements 18 may be utilized to direct the light of each DRL LED and each eAFS LED in a particular direction. As shown in FIG. 7, the optical elements 18 for each DRL LED may direct the light substantially towards the front of the vehicle, and the optical elements 18 for each eAFS LED may direct the light at specified angles $\beta_x$. For example, the optical element 18 for eAFS LED light sector $L_1$ may direct the light to the front and left side of the vehicle at an angle $\beta_1$, the optical element 18 for eAFS LED light sector $L_2$ may direct the light to the front and left side of the vehicle at an angle $\beta_2$, and the optical element 18 for eAFS LED light sector $L_3$ may direct the light to the front and left side of the vehicle at an angle $\beta_3$. The optical elements 18 may include reflectors, lenses, etc.

The light sectors $L_1, L_2, L_3$ of the exemplary system 11, as shown in FIG. 7, may be angled at angles $\beta_1, \beta_2, \beta_3$, respectively, in order to illuminate areas forward and to the left of the vehicle for the driving situation in which the vehicle is driving along a roadway curving towards the left. However, it should be understood that similar light sectors of the exemplary system 11 may be angled at similar angles, respectively, in order to illuminate areas forward and to the right of the vehicle for the driving situation in which the vehicle is driving along a roadway curving towards the right.

By integrating the eAFS LEDs and DRL LEDs into a single module 15, both the eAFS LEDs and the DRL LEDs may use similar LED technology. In addition, both the eAFS LEDs and DRL LEDs may receive power and control signals from the same components, thereby saving cost and reducing development efforts. Further, in the case of a system already including DRL LEDs, the eAFS LEDs may be integrated into the module 15 while maintaining the original overall design of the system 11.

Figure 8:
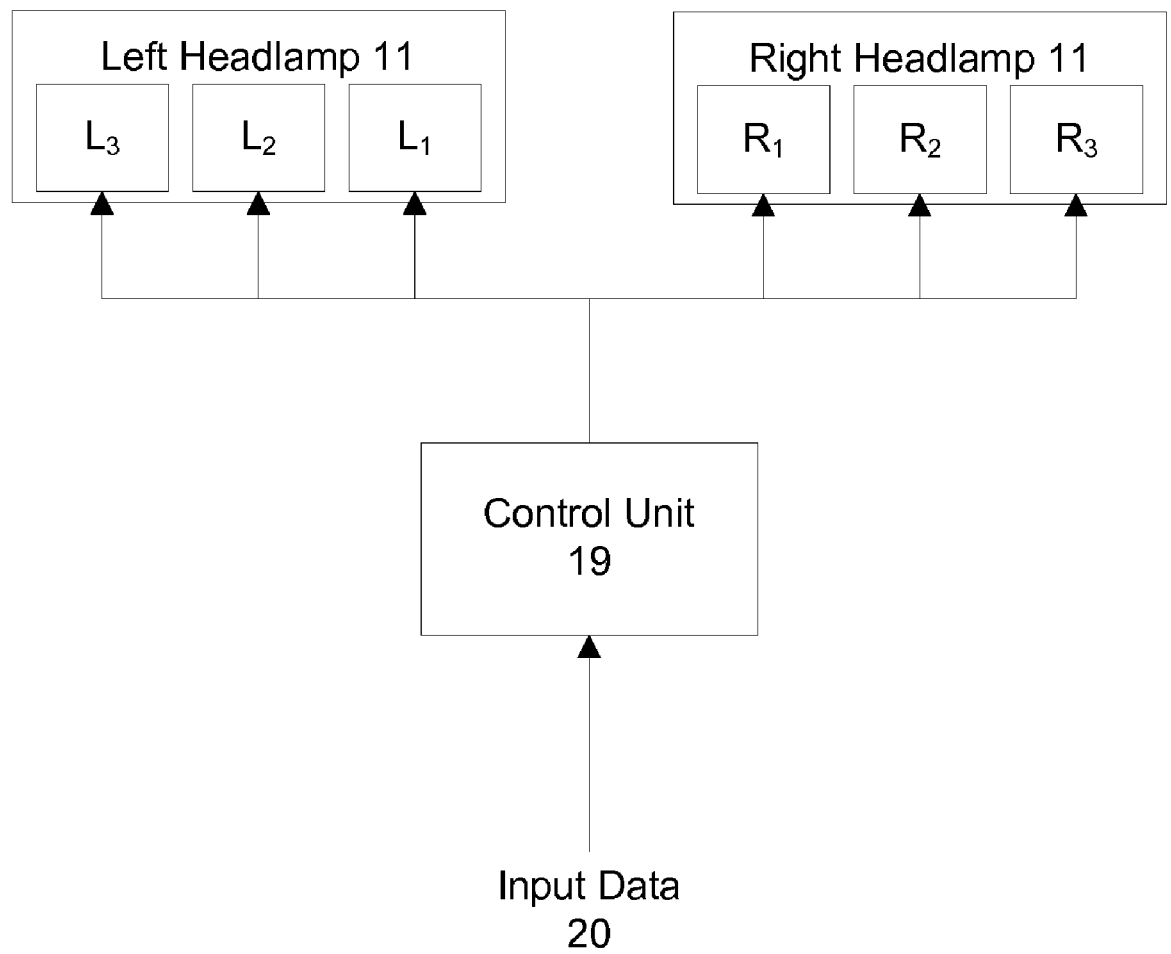
FIG. 8 is a schematic block diagram of a system for controlling electronic adaptive front-lighting of a vehicle.

FIG. 8 shows a schematic block diagram of a system for controlling electronic adaptive front-lighting of a vehicle. The control system may include a left headlamp system 11 including eAFS LED light sectors $L_1, L_2, L_3$, a right headlamp system 11 including eAFS LED light sectors $R_1, R_2, R_3$, a control unit 19, and input data 20. Input data 20 may include vehicle data, such as, for example, vehicle speed, steering wheel angle, road characteristics, etc. Input data 20 may be fed into the control unit 19, which then independently controls each of the eAFS light sectors $L_1$, $L_2$, $L_3$, $R_1$, $R_2$, $R_3$ of the left and right headlamp systems 11 to turn on, turn off, and/or vary the light intensity of each of the eAFS LED light sectors.

LED technology allows the achievement of intermediate luminance values very accurately and quickly. This inherent dimming capability of LEDs may be utilized to create different driving sensations when adding/removing/varying light to the left or right of the standard light distribution 16. By using a plurality of light dimming functions to create any sensation between a very smooth addition/subtraction/modification light control and a very abrupt on/off light control, a completely new driving experience may be achieved.

Figure 9:
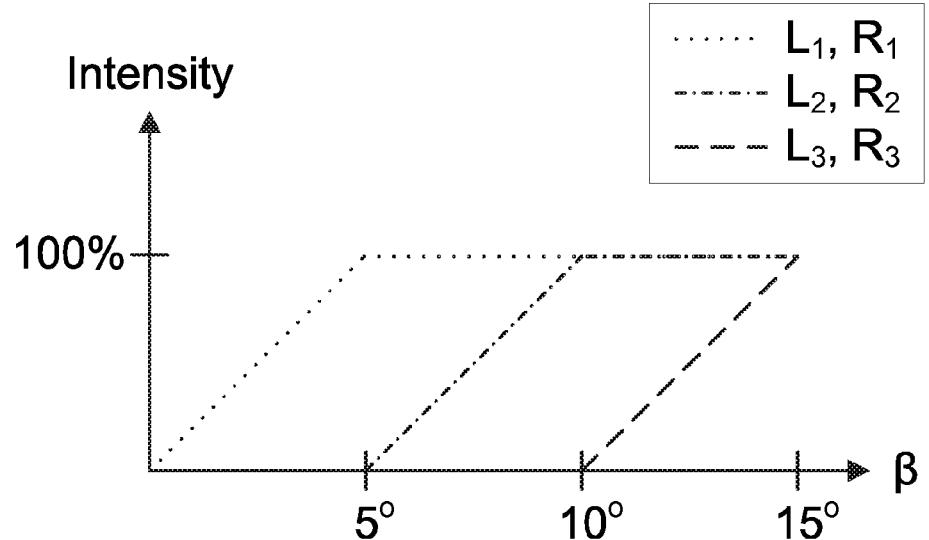
FIG. 9 illustrates an automatic dimming mode of a system for electronic adaptive front-lighting of a vehicle.
Figure 10:
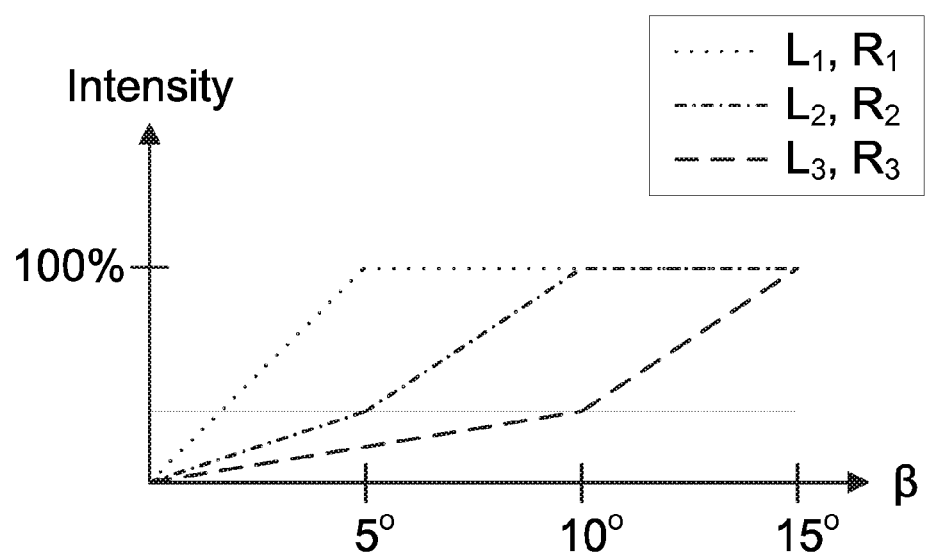
FIG. 10 illustrates a comfort dimming mode of a system for electronic adaptive front-lighting of a vehicle.
Figure 11:
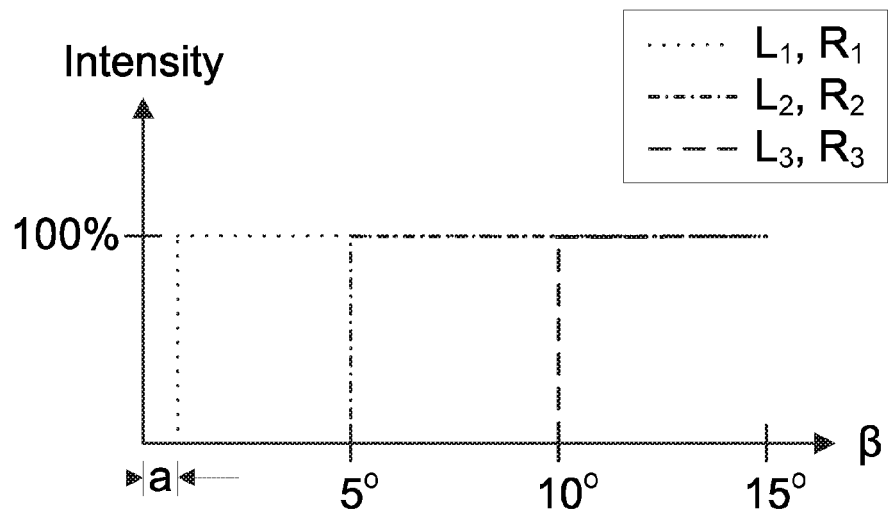
FIG. 11 illustrates a steep dynamic dimming mode of a system for electronic adaptive front-lighting of a vehicle.
Figure 12:
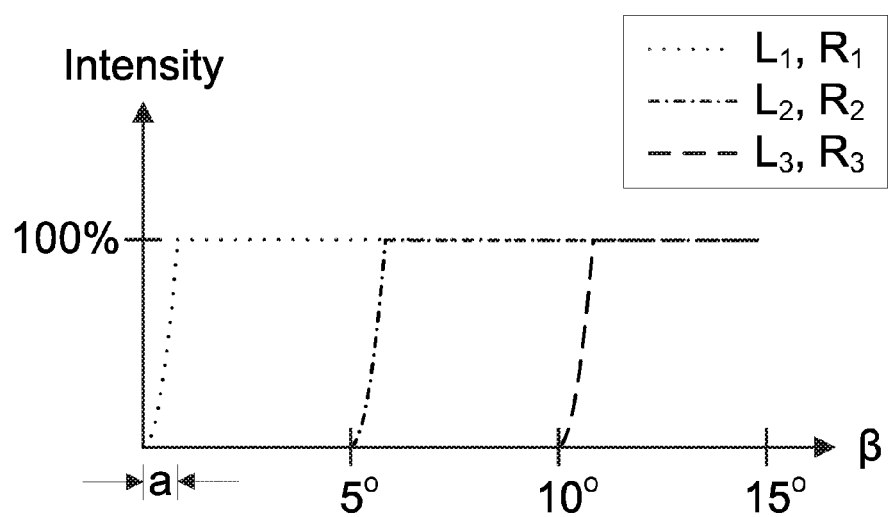
FIG. 12 illustrates a smooth dynamic dimming mode of a system for electronic adaptive front-lighting of a vehicle.
Figure 13:
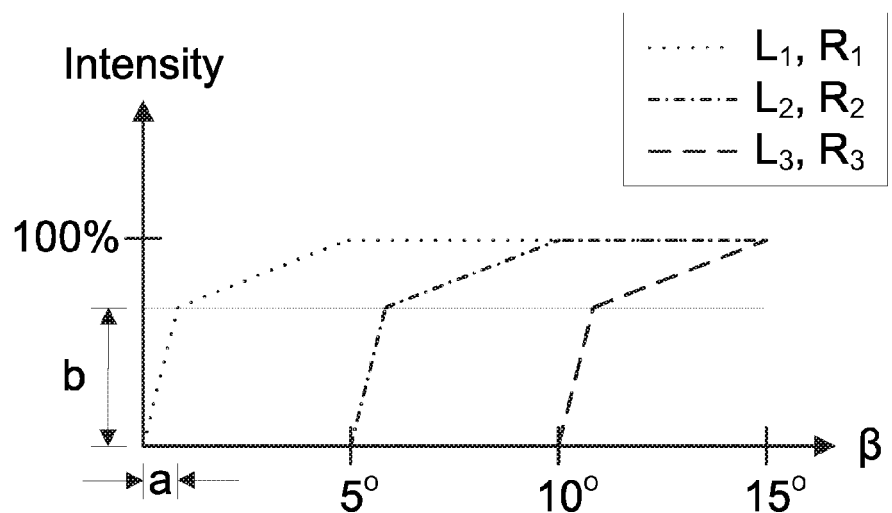
FIG. 13 illustrates an individually defined dimming mode of a system for electronic adaptive front-lighting of a vehicle.

FIGS. 9 to 13 illustrate example light dimming modes to create a variety of driving sensations. FIG. 9 illustrates an automatic dimming mode, FIG. 10 illustrates a comfort dimming mode, FIG. 11 illustrates a steep dynamic dimming mode, FIG. 12 illustrates a smooth dynamic dimming mode, and FIG. 13 illustrates an individually defined dimming mode of a system for electronic adaptive front-lighting of a vehicle.

In these Figures, the vertical axis represents the light intensity from 0% to 100%. The horizontal axis represents the angle $\beta$ at which the overall light distribution is to be directed. In the example embodiments of FIGS. 9 to 13, the angle $\beta$ is defined to be between 0° and 15°, and the center axes of the light sectors $L_1$ and $R_1$, $L_2$ and $R_2$, and $L_3$ and $R_3$ are defined to be 5°, 10°, and 15°, respectively, to the left or right of the standard light distribution.

In the automatic dimming mode illustrated in FIG. 9, the light intensity of each of the light sectors has a linear relationship with the angle $\beta$, i.e., the light intensity is directly proportional to the angle $\beta$. For example, the light intensity of light sector $L_1$ increases linearly from 0% to 100% when the angle $\beta$ increases from 0° to 5° and remains constant at 100% at an angle $\beta$ greater than 5°. In addition, the light intensity of light sector $L_2$ remains at 0% when the angle $\beta$ is between 0° to 5°, increases linearly from 0% to 100% when the angle $\beta$ increases from 5° to 10°, and remains constant at 100% at an angle $\beta$ greater than 10°. Finally, the light intensity of light sector $L_3$ remains at 0% when the angle $\beta$ is between 0° to 10°, increases linearly from 0% to 100% when the angle $\beta$ increases from 10° to 15°, and remains constant at 100% at an angle $\beta$ greater than 15°.

In the comfort dimming mode illustrated in FIG. 10, the light intensity of each of the light sectors has a different linear relationship with the angle $\beta$. For example, the light intensity of light sector $L_1$ increases linearly from 0% to 100% when the angle $\beta$ increases from 0° to 5° and remains constant at 100% at an angle $\beta$ greater than 5°. In addition, the light intensity of light sector $L_2$ increases linearly to a particular value when the angle $\beta$ increases from 0° to 5°, then increases linearly differently from the particular value to 100% when the angle $\beta$ increases from 5° to 10°, and remains constant at 100% at an angle $\beta$ greater than 10°. Finally, the light intensity of light sector $L_3$ increases linearly to a particular value when the angle $\beta$ increases from 0° to 10°, then increases linearly differently from the particular value to 100% when the angle $\beta$ increases from 10° to 15°, and remains constant at 100% at an angle $\beta$ greater than 15°.

In the steep dynamic dimming mode illustrated in FIG. 11, the light intensity of each of the light sectors follows a step function based on the angle $\beta$, i.e., the light intensity is either on or off based on the angle $\beta$. For example, the light intensity of light sector $L_1$ steps from 0% to 100% at an offset value "a" between values of the angle $\beta$ from 0° to 5° and remains constant at 100% at an angle $\beta$ greater than the offset value "a". In addition, the light intensity of light sector $L_2$ remains at 0% when the angle $\beta$ is between 0° to 5°, steps from 0% to 100% when the angle $\beta$ is 5°, and remains constant at 100% at an angle $\beta$ greater than 5°. Finally, the light intensity of light sector $L_3$ remains at 0% when the angle $\beta$ is between 0° to 10°, steps from 0% to 100% when the angle $\beta$ is 10°, and remains constant at 100% at an angle $\beta$ greater than 10°.

In the smooth dynamic dimming mode illustrated in FIG. 12, the light intensity of each of the light sectors increases exponentially to a step function based on the angle $\beta$, i.e., the light intensity is exponentially turned on based on the angle $\beta$. For example, the light intensity of light sector $L_1$ increases exponentially from 0% to 100% when the angle $\beta$ increases from 0° to an offset value "a", and remains constant at 100% at an angle $\beta$ greater than the offset value "a". In addition, the light intensity of light sector $L_2$ remains at 0% when the angle $\beta$ is between 0° to 5°, increases exponentially from 0% to 100% when the angle $\beta$ increases from 5° to (5°+offset value "a"), and remains constant at 100% at an angle $\beta$ greater than (5°+offset value "a"). Finally, the light intensity of light sector $L_3$ remains at 0% when the angle $\beta$ is between 0° to 10°, increases exponentially from 0% to 100% when the angle $\beta$ increases from 10° to (10°+offset value "a"), and remains constant at 100% at an angle $\beta$ greater than (10°+offset value "a").

In the individually defined dimming mode illustrated in FIG. 13, the light intensity of each of the light sectors follows an individually defined relationship with the angle $\beta$ for each light sector. For example, the light intensity of light sector $L_1$ increases linearly from 0% to a particular value "b" when the angle $\beta$ increases from 0° to an offset value "a", increases linearly from the particular value "b" to 100% when the angle $\beta$ increases from the offset value "a" to 5°, and remains constant at 100% at an angle $\beta$ greater than 5°. In addition, the light intensity of light sector $L_2$ remains at 0% when the angle $\beta$ is between 0° to 5°, increases linearly to a particular value "b" when the angle $\beta$ increases from 5° to (5°+offset value "a"), then increases linearly from the particular value "b" to 100% when the angle $\beta$ increases from (5°+offset value "a") to 10°, and remains constant at 100% at an angle $\beta$ greater than 10°. Finally, the light intensity of light sector $L_3$ remains at 0% when the angle $\beta$ is between 0° to 10°, increases linearly to a particular value "b" when the angle $\beta$ increases from 10° to (10°+offset value "a"), then increases linearly from the particular value "b" to 100% when the angle $\beta$ increases from (10°+offset value "a") to 15°, and remains constant at 100% at an angle $\beta$ greater than 15°.

As illustrated in FIGS. 11 to 13, the offset value "a" is intended to avoid unwanted flickering of the light when the angle $\beta$ varies slightly around 0°, which may occur frequently during real driving situations. In addition, as illustrated in FIG. 13 for the individually defined dimming mode, the offset value "a" and the particular value "b" may be individually defined in order to suit the preferences of a driver, a particular vehicle, a vehicle manufacturer, etc.

Further, the dimming modes as illustrated in FIGS. 9 to 13 may be automatically activated when other variable controls of a vehicle are activated, such as, for example, based on the haptic feedback of the steering wheel, the haptic feedback of the pedals, the haptic feedback of the suspension, the engine behavior, etc. Alternatively, the dimming modes as illustrated in FIGS. 9 to 13 may be manually activated and independently modified by a driver, such as, for example, by using a dedicated menu in the vehicle controls, by a dedicated switch, etc.

The example embodiments of a system 11 for electronic adaptive front-lighting (eAFS) of a vehicle may be implemented more quickly and cost-effectively than other presently available adaptive front-lighting systems (AFS). By utilizing solid state light sources, such as LEDs, exclusively for providing additional lighting to front peripheral regions of a vehicle, curve light functionality may be achieved. Thus, the standard, and legally required, front light distribution may be achieved by any known type of lighting technology, including incandescent, halogen, xenon, etc.

The example embodiments of a system 11 for electronic adaptive front-lighting (eAFS) of a vehicle may provide additional benefits such as lower cost, higher feasibility, simple design, manufacturability, styling opportunities, independent control, multiple driving experiences and comfort levels, and the elimination of moving parts. In terms of cost, the system 11 may merely add LEDs, their respective driving electronics, and a heat management system. In terms of feasibility, design, and manufacturability, LED technology is presently used for DRL modules, and LED technology has also been combined with other lighting technologies, such as incandescent, halogen, xenon, etc. In terms of styling, the system 11 may be used to enhance the styling of a vehicle. In addition, because of the small size of LEDs, the system 11 may be used without significantly impacting or modifying the existing styling of a vehicle, while significantly increasing the functionality of a vehicle. In terms of independent control, the system 11 may allow independently created and controlled curve light functionality at different peripheral angles of the vehicle. In terms of driving experiences and comfort levels, the system 11 may provide different lighting patterns, which may be automatically controlled by the vehicle based on driving behavior, for example, or manually controlled by the driver. Finally, the system 11 may allow for the provision of curve light functionality without the addition of moving parts.

What is claimed is:

1. A system for electronic adaptive front-lighting of a vehicle, comprising:
   at least one fixed solid state light source configured to illuminate a front peripheral region of a vehicle, and
   a control unit configured to independently control the at least one fixed solid state light source, and configured to vary an intensity of the at least one fixed solid state light source based on an angle at which an overall light distribution is to be directed;
   wherein the at least one fixed solid state light source is integrated with a daytime running light module of the vehicle.

2. The system according to claim 1, wherein the at least one fixed solid state light source includes at least one light emitting diode.

3. The system according to claim 1, further comprising an optical element configured to provide a smooth light distribution.

4. The system according to claim 3, wherein the optical element includes at least one of: (a) a reflector, and (b) a lens.

5. The system according to claim 1, wherein the at least one fixed solid state light source shares a location with a light source of the daytime running light module.

6. The system according to claim 1, wherein the at least one fixed solid state light source includes a plurality of fixed light sources.

7. The system according to claim 6, wherein the plurality of fixed light sources are arranged at least one of: (a) vertically, (b) horizontally, (c) diagonally, (d) in a straight line, and (e) in a curved line.

8. The system according to claim 6, wherein each fixed light source is configured to illuminate a different front peripheral region of the vehicle.

9. The system according to claim 6, wherein each fixed light source shares a location with a light source of the daytime running light module.

10. The system according to claim 1, wherein the control unit is configured to independently control the at least one fixed solid state light source based on at least one of: (a) a particular driving situation, (b) a vehicle speed, (c) a steering wheel angle, (d) a proximity to other vehicles, (e) a selected driving program, (f) an actuation of an input device, and (g) road characteristics.

11. The system according to claim 1, wherein the varying intensity of the at least one fixed solid state light source includes at least one of: (a) automatic dimming, (b) comfort dimming, (c) steep dynamic dimming, (d) smooth dynamic dimming, and (e) individually defined dimming modes.

12. The system according to claim 1, wherein the control unit is configured to be at least one of: (a) automatically activated, and (b) manually activated.

13. The system according to claim 12, wherein the control unit is configured to be automatically activated based on at least one of: (a) haptic feedback of a steering wheel, (b) haptic feedback of pedals, (c) haptic feedback of a vehicle suspension, and (d) engine behavior.

14. The system according to claim 12, wherein the control unit is configured to be manually activated based on at least one of: (a) a dedicated switch, and (b) a dedicated menu of vehicle controls.

15. A method for electronic adaptive front-lighting of a vehicle, comprising:
   illuminating, by at least one fixed solid state light source, a front peripheral region of a vehicle; and
   independently controlling, by a control unit, the at least one fixed solid state light source;
   wherein the control unit varies an intensity of the at least one fixed solid state light source based on an angle at which an overall light distribution is to be directed; and
   wherein the at least one fixed solid state light source is integrated with a daytime running light module of the vehicle.

16. The method according to claim 15, further comprising providing, by an optical element, a smooth light distribution.

17. The method according to claim 15, wherein the at least one fixed solid state light source shares a location with a light source of the daytime running light module.

18. The method according to claim 15, wherein the at least one fixed solid state light source includes a plurality of fixed light sources.

19. The method according to claim 18, wherein the plurality of fixed light sources are arranged at least one of: (a) vertically, (b) horizontally, (c) diagonally, (d) in a straight line, and (e) in a curved line.

20. The method according to claim 18, wherein the plurality of fixed light sources each illuminates a different front peripheral region of the vehicle.

21. The method according to claim 18, wherein the plurality of fixed light sources each shares a location with a light source of the daytime running light module.

22. The method according to claim 15, wherein the control unit independently controls the at least one fixed solid state light source based on at least one of: (a) a particular driving situation, (b) a vehicle speed, (c) a steering wheel angle, (d) a proximity to other vehicles, (e) a selected driving program, (f) an actuation of an input device, and (g) road characteristics.

23. The method according to claim 15, wherein the control unit varies the intensity of the at least one fixed solid state light source by at least one of: (a) automatic dimming, (b)

comfort dimming, (c) steep dynamic dimming, (d) smooth dynamic dimming, and (e) individually defined dimming modes.

24. The method according to claim 15, wherein the control unit is at least one of: (a) automatically activated, and (b) manually activated.

25. The method according to claim 24, wherein the control unit is automatically activated based on at least one of: (a) haptic feedback of a steering wheel, (b) haptic feedback of pedals, (c) haptic feedback of a vehicle suspension, and (d) engine behavior.

26. The method according to claim 24, wherein the control unit is manually activated based on at least one of: (a) a dedicated switch, and (b) a dedicated menu of vehicle controls.

* * * * *